US009335962B2

(12) United States Patent
Konita et al.

(10) Patent No.: US 9,335,962 B2
(45) Date of Patent: May 10, 2016

(54) PRINT MANAGEMENT DEVICE, PRINT MANAGEMENT SYSTEM, PRINT MANAGEMENT METHOD AND COMPUTER READABLE MEDIUM

(75) Inventors: Naoya Konita, Yokohama (JP); Takashi Sakayama, Yokohama (JP); Shinji Akahira, Yokohama (JP); Daigo Yamagishi, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 1170 days.

(21) Appl. No.: 12/948,104

(22) Filed: Nov. 17, 2010

(65) Prior Publication Data

US 2011/0286033 A1 Nov. 24, 2011

(30) Foreign Application Priority Data

May 24, 2010 (JP) .................................. 2010-118128

(51) Int. Cl.
G06F 3/12 (2006.01)

(52) U.S. Cl.
CPC ............ G06F 3/1274 (2013.01); G06F 3/1207 (2013.01); G06F 3/1259 (2013.01); G06F 3/1285 (2013.01)

(58) Field of Classification Search
CPC ... G06F 3/1274; G06F 3/1285; G06F 3/1207; G06F 3/1259
See application file for complete search history.

(56) References Cited

U.S. PATENT DOCUMENTS

| 6,958,822 B2 * | 10/2005 | Lester ..................... G06K 15/00 358/1.14 |
| 2003/0065404 A1 | 4/2003 | Bhatti |
| 2004/0100642 A1 | 5/2004 | Nozato |
| 2006/0176512 A1 * | 8/2006 | Nishimura ......... H04N 1/32486 358/1.15 |
| 2006/0187481 A1 | 8/2006 | Hayakawa |
| 2007/0097409 A1 * | 5/2007 | Goings et al. ................. 358/1.14 |
| 2007/0211296 A1 | 9/2007 | Toda |
| 2008/0137123 A1 | 6/2008 | Nozato |
| 2008/0158586 A1 | 7/2008 | Moon et al. |
| 2008/0259391 A1 * | 10/2008 | Maruo ..................... G06F 3/121 358/1.15 |
| 2008/0298827 A1 * | 12/2008 | Akiyama ........... G03G 15/6511 399/44 |
| 2008/0313360 A1 * | 12/2008 | Abe ....................... G06F 3/1207 710/18 |

(Continued)

FOREIGN PATENT DOCUMENTS

| CN | 101038533 A | 9/2007 |
| CN | 101229731 A | 7/2008 |

(Continued)

OTHER PUBLICATIONS

Extended European Search Report dated Jan. 25, 2013, issued in corresponding European Patent Application No. 10192185.6.

(Continued)

*Primary Examiner* — Benjamin O Dulaney
(74) *Attorney, Agent, or Firm* — Sughrue Mion, PLLC

(57) ABSTRACT

A print management device includes: a receiving unit that receives a print instruction to perform print of an electronic document on recording media; a canceling unit that cancels the print caused to be performed by the print instruction received by the receiving unit, in accordance with a canceling instruction of the print by an operator; and a recording unit that records the number of the recording media or the number of faces of the recording media, if the print caused to be performed by the print instruction received by the receiving unit is canceled by the canceling unit, the print on the recording media being canceled.

18 Claims, 12 Drawing Sheets

(56) References Cited

U.S. PATENT DOCUMENTS

| | | | |
|---|---|---|---|
| 2009/0190166 A1* | 7/2009 | Nakamura | G06F 3/1219 358/1.15 |
| 2009/0279121 A1* | 11/2009 | Bostick | G06F 3/1263 358/1.15 |
| 2010/0149580 A1* | 6/2010 | Iizuka | G06F 21/608 358/1.14 |
| 2011/0194135 A1* | 8/2011 | Hamilton | G06F 3/1208 358/1.14 |

FOREIGN PATENT DOCUMENTS

| | | |
|---|---|---|
| JP | 03-085554 A | 4/1991 |
| JP | 05212917 A | 8/1993 |
| JP | 10-207310 A | 8/1998 |
| JP | 11353137 A | 12/1999 |
| JP | 2001229004 A | 8/2001 |
| JP | 2002-259083 A | 9/2002 |
| JP | 2003-186361 A | 7/2003 |
| JP | 2003-248576 A | 9/2003 |
| JP | 2004015327 A | 1/2004 |
| JP | 2004178322 A | 6/2004 |
| JP | 2004-326433 A | 11/2004 |
| JP | 200631464 A | 2/2006 |
| JP | 2006085352 A | 3/2006 |
| JP | 2006127429 A | 5/2006 |
| JP | 2006166214 A | 6/2006 |
| JP | 2006231673 A | 9/2006 |
| JP | 2006264130 A | 10/2006 |
| JP | 2006294050 A | 10/2006 |
| JP | 2008-040031 A | 2/2008 |
| JP | 200840031 A | 2/2008 |
| JP | 2009075831 A | 4/2009 |

OTHER PUBLICATIONS

English translation of Japanese Office Action issued Jan. 28, 2014 in corresponding Japanese Patent Application No. 2010-118128.
English translation of the Chinese Office Action issued on Jul. 25, 2014, for the counterpart Chinese Application No. 201010609954.4.
English translation of communication dated Feb. 10, 2015 from the Japanese Patent Office in counterpart application No. 2014-206367.
English translation of communication dated Feb. 10, 2015 from the Japanese Patent Office in counterpart application No. 2014-264701.
Communication dated May 19, 2015 issued in corresponding Japanese Patent Application No. 2014-264701.

\* cited by examiner

FIG.10

| USER ID | A4 COLOR | A4 MONOCHROME | B4 COLOR | B4 MONOCHROME | ... |
|---|---|---|---|---|---|
| U0001 | 18 | 301 | 11 | 16 | ... |
| U0002 | 56 | 95 | 35 | 50 | ... |
| U0003 | 20 | 73 | 23 | 37 | ... |
| U0004 | 49 | 264 | 4 | 29 | ... |
| U0005 | 37 | 182 | 2 | 48 | ... |
| ⋮ | ⋮ | ⋮ | ⋮ | ⋮ | ⋮ |

PRINT MANAGEMENT DEVICE, PRINT MANAGEMENT SYSTEM, PRINT MANAGEMENT METHOD AND COMPUTER READABLE MEDIUM

CROSS REFERENCE TO RELATED APPLICATIONS

This application is based on and claims priority under 35 USC §119 from Japanese Patent Application No. 2010-118128 filed May 24, 2010.

BACKGROUND

1. Technical Field

The present invention relates to a print management device, a print management system, a print management method and a computer readable medium storing a program.

2. Related Art

There is known a printer device having a function that speeds print when documents being on print standby are stagnant without being outputted for a long time.

There is also known a print system whose object is to efficiently delete unnecessary image data by easily distinguishing necessary image data from unnecessary image data.

SUMMARY

According to an aspect of the present invention, there is provided a print management device including: a receiving unit that receives a print instruction to perform print of an electronic document on recording media; a canceling unit that cancels the print caused to be performed by the print instruction received by the receiving unit, in accordance with a canceling instruction of the print by an operator; and a recording unit that records the number of the recording media or the number of faces of the recording media, if the print caused to be performed by the print instruction received by the receiving unit is canceled by the canceling unit, the print on the recording media being canceled.

BRIEF DESCRIPTION OF THE DRAWINGS

Exemplary embodiment(s) of the present invention will be described in detail based on the following figures, wherein:

FIG. 10 is a table showing contents of the counter recorded in the first to fourth exemplary embodiments;

DETAILED DESCRIPTION

Exemplary embodiments of the present invention will be described below in detail with reference to the accompanying drawings.

[Computer System]

Figure 1:
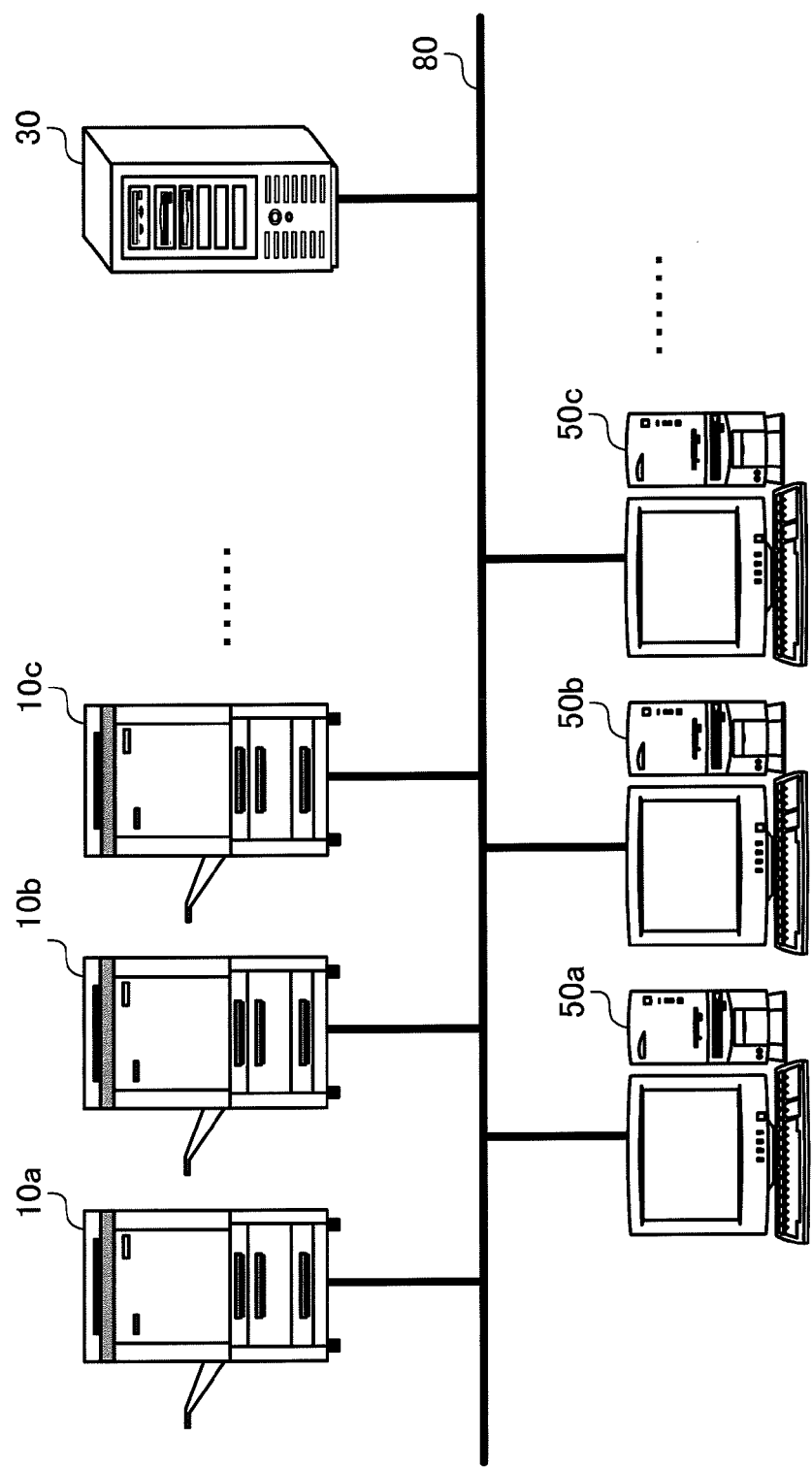
FIG. 1 is a diagram showing a configuration example of a computer system to which the exemplary embodiments of the present invention are applied.

FIG. 1 is a diagram showing an example of an overall configuration of a computer system, serving as an example of a print management system, according to the present exemplary embodiments.

As shown in FIG. 1, the computer system is configured by image forming apparatuses 10a, 10b and 10c, an aggregate server 30 and terminal devices 50a, 50b and 50c that are connected to a network 80. Although the image forming apparatuses 10a, 10b and 10c are shown in FIG. 1, these image forming apparatuses may be referred to as image forming apparatuses 10 if they do not need to be distinguished. Although only three image forming apparatuses 10 are shown in FIG. 1, four or more image forming apparatuses 10 may be provided. Furthermore, although the terminal devices 50a, 50b and 50c are shown in FIG. 1, these terminal devices may be referred to as terminal devices 50 if they do not need to be distinguished. Although only three terminal devices 50 are shown in FIG. 1, four or more terminal devices 50 may be provided.

Each image forming apparatus 10 is an apparatus that prints an image of document data, which is an example of an electronic document, on a recording medium and outputs the image as a printed document. The image forming apparatus 10 may include only a printer function, or include a scanner function and a facsimile function in addition to the printer function.

The aggregate server 30 is a server computer that aggregates information managed by each of the image forming apparatuses 10 and provides an aggregate result for each of the terminal devices 50. As the aggregate server 30, for example, a computer such as a personal computer, a work station or the like may be used.

Each terminal device 50 is a computer device that instructs the image forming apparatus 10 to print document data. As the terminal device 50, for example, a computer such as a personal computer, a work station or the like may be used.

The network 80 is a communication means used for exchanging various kinds of information. As the network 80, the Internet and a local area network (LAN) are exemplified.

In the present specification, electronic data serving as a source of an image recorded on a recording medium is described as "document data." However, the implication of the "document data" is not limited to computerized data of a "document" including texts. For example, the "document data" includes image data, such as a picture, a photograph and a drawing (irrespective of raster data or vector data), data recorded by database management software or spreadsheet software, and other printable electronic data.

Additionally, in the present specification, a "recording medium" may be made of any material as long as an image is printable on the medium. Although a representative example of the recording medium is paper, an OHP sheet, a metal plate and the like may also be used.

In recent years, awareness of environmental issues has been raised. Also in a computer system as described above, it is required that the amount of reduction in recording media and the like used in the image forming apparatuses 10 should be recognized on a user side. Thus, in the present exemplary embodiments, recording media and the like whose consumption has been restrained are counted by a counter.

Hereinafter, a description will be given in the following order: the image forming apparatus 10 that manages a counter of recording media and the like whose consumption has been restrained; and the aggregate server 30 that aggregates information on counters managed by the image forming apparatuses 10.

[Image Forming Apparatus]

Figure 2:
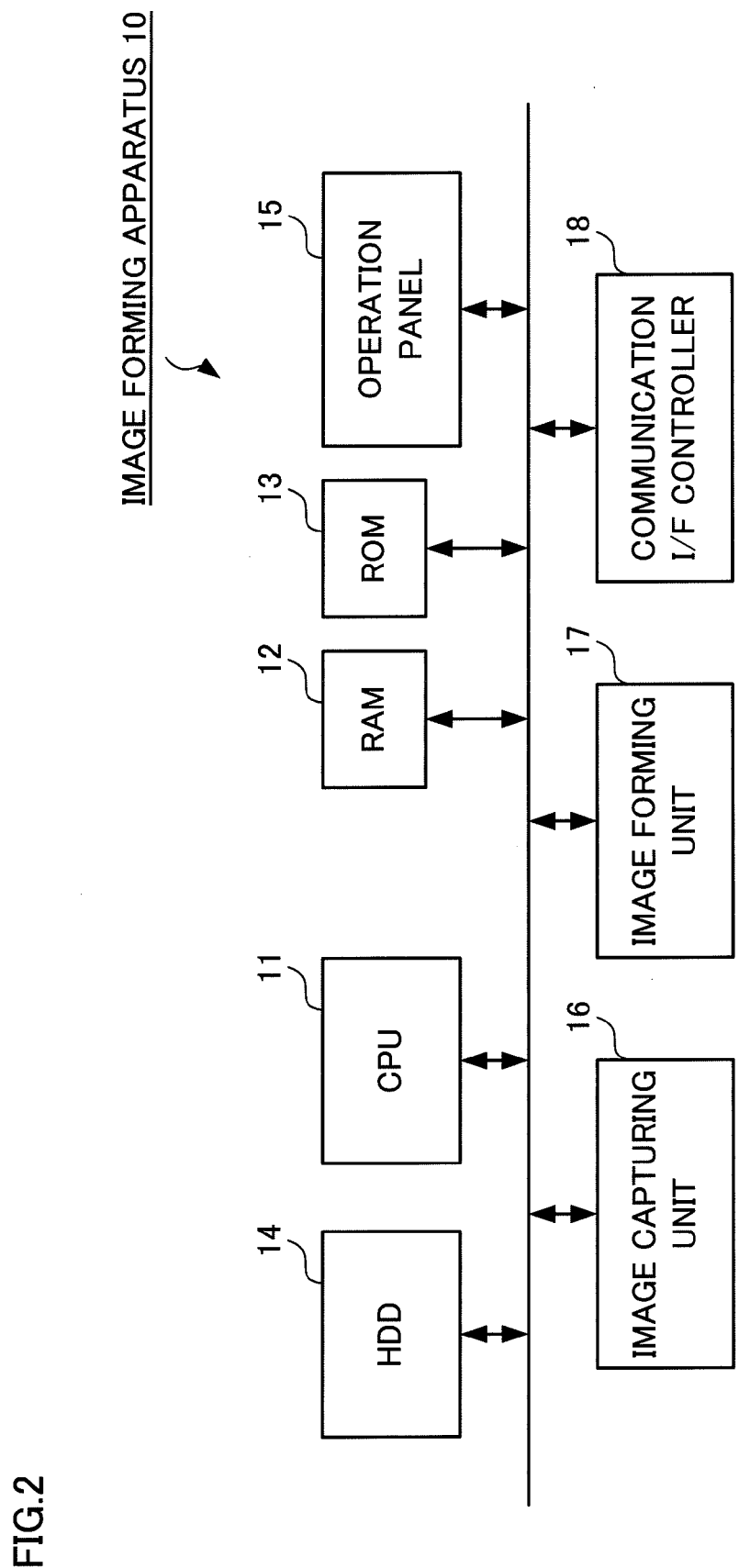
FIG. 2 is a diagram showing a configuration example of the image forming apparatus to which the exemplary embodiments of the present invention are applied.

FIG. 2 is a diagram showing an example of a hardware configuration of the image forming apparatus 10.

As shown in FIG. 2, the image processing apparatus 10 includes a central processing unit (CPU) 11, a random access memory (RAM) 12, a read only memory (ROM) 13, a hard disk drive (HDD) 14, an operation panel 15, an image capturing unit 16, an image forming unit 17 and a communication interface controller (hereinafter, referred to as a "communication I/F controller") 18.

The CPU 11 loads various programs stored in the ROM 13 and the like into the RAM 12, and then executes the programs, thereby to implement functions to be described later.

The RAM 12 is a memory that is used as a working memory or the like for the CPU 11.

The ROM 13 is a memory that stores, therein, the various programs executed by the CPU 11.

The HDD 14 is, for example, a magnetic disk device that stores, therein, image data captured by the image capturing unit 16, image data used for image formation in the image forming unit 17, and the like.

The operation panel 15 is, for example, a touch panel that displays various kinds of information and receives an operation input by a user.

The image capturing unit 16 captures an image recorded on a recording medium such as paper. The image capturing unit 16 herein is, for example, a scanner. The scanner to be used may employ one of the following two systems: a CCD system in which reflected light of light emitted from a light source and directed at an original is reduced by a lens and is then received by charge coupled devices (CCD); and a CIS system in which reflected light of light beams sequentially emitted from LED light sources and directed at an original is received by a contact image sensor (CIS).

The image forming unit 17 forms an image on a recording medium. The image forming unit 17 herein is, for example, a printer. The printer to be used may employ one of the following two systems: an electrophotographic system in which an image is formed by transferring toner attached to a photoconductive drum onto a recording medium; and an ink jet system in which an image is formed by ejecting ink onto a recording medium.

The communication I/F controller 18 transmits and receives various kinds of information to and from other devices through the network 80.

In the present exemplary embodiments, a print management unit 20, serving as an example of a print management device that counts and manages recording media and the like whose consumption has been restrained, is achieved in the image processing apparatus 10 by the CPU 11 loading a program stored in the ROM 13 into the RAM 12, and executing the program.

Hereinafter, this print management unit 20 will be described in exemplary embodiments according to timing at which recording media and the like are saved, for example.

[First Exemplary Embodiment]

The first exemplary embodiment is an exemplary embodiment in which a print job is canceled before print of document data is started, in a case where the document data is not stored in the image forming apparatus 10 after a user enters the print job into the image forming apparatus 10, the print job being an instruction to print the document data.

First, a description will be given of a functional configuration of the print management unit 20 according to the first exemplary embodiment.

Figure 3:
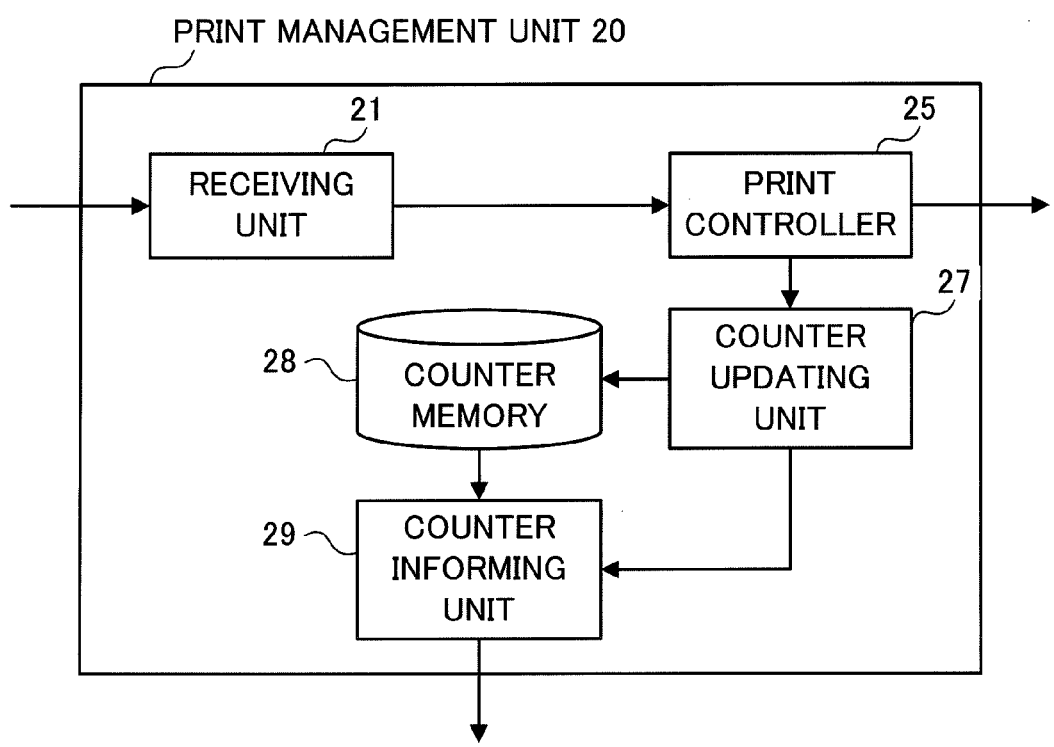
FIG. 3 is a block diagram showing an example of a functional configuration of the print management unit according to the first exemplary embodiment.

FIG. 3 is a block diagram showing an example of a functional configuration of the print management unit 20 according to the first exemplary embodiment.

As shown in FIG. 3, the print management unit 20 includes a receiving unit 21, a print controller 25, a counter updating unit 27, a counter memory 28 and a counter informing unit 29. Among these, the counter memory 28 is implemented by the HDD 14 (see FIG. 2), for example. The receiving unit 21, the print controller 25, the counter updating unit 27 and the counter informing unit 29 are achieved by the CPU 11 (see FIG. 2) loading a program stored in the ROM 13 (see FIG. 2) into the RAM 12 (see FIG. 2) and executing the program.

The receiving unit 21 receives a print job from the terminal device 50. The print job herein is a unit of processing executed in the image forming apparatus 10 on the basis of print instruction information that is an instruction to print document data. In the present specification, the print instruction information may be referred to as print job. Additionally, the receiving unit 21 may also receive cancel instruction information that is an instruction to cancel the print job. In the first exemplary embodiment, the print job is used as an example of a print instruction, and the receiving unit 21 is provided as an example of a receiving unit that receives the print instruction.

The print controller 25 controls print of document data by executing the print job received by the receiving unit 21. Additionally, if the receiving unit 21 receives the cancel instruction information before the start of print, the print controller 25 performs control so that the print job received by the receiving unit 21 is canceled. In the first exemplary embodiment, the print controller 25 is provided as an example of a canceling unit that cancels print.

The counter updating unit 27 updates the value of a printed document reducing counter and the value of a staple needle reducing counter that are stored in the counter memory 28, if a print job is canceled. In the first exemplary embodiment, the counter updating unit 27 is provided as an example of a recording unit that records the number of recording media or the number of faces of recording media, print on the recording media being canceled.

The counter memory 28 stores, therein, the value of the printed document reducing counter and the value of the staple needle reducing counter. The printed document reducing counter is a memory area for counting the number of recording media or the number of faces of recording media whose consumption has been restrained by canceling a print job before a printed document is outputted. The staple needle reducing counter is a memory area for counting the number of staple needles whose consumption has been restrained by canceling a print job before a printed document is outputted, in a case where staple binding is designated in the print job.

The counter informing unit 29 informs external devices of the value of the printed document reducing counter and the value of the staple needle reducing counter that are stored in the counter memory 28. In the first exemplary embodiment, the counter informing unit 29 is provided as an example of an outputting unit that outputs information on the number of recording media or the number of faces of recording media.

Next, a description will be given of an operation of the print management unit 20 according to the first exemplary embodiment.

Figure 4:
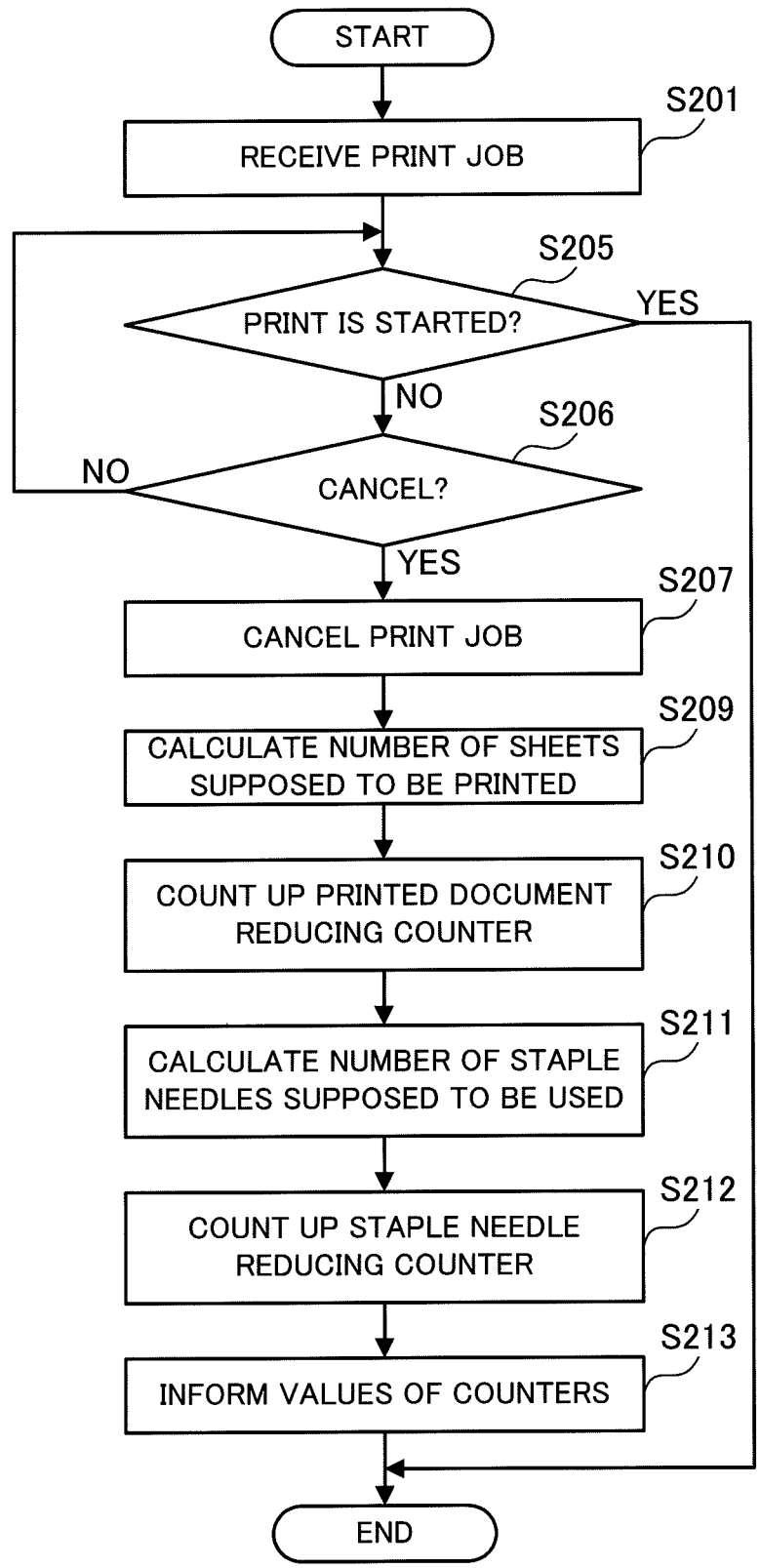
FIG. 4 is a flowchart showing an operation example of the print management unit according to the first exemplary embodiment.

FIG. 4 is a flowchart showing an operation example of the print management unit 20 according to the first exemplary embodiment. In this operation example, sheets are used as the recording media, and the number of sheets is counted by the printed document reducing counter.

In the print management unit 20, the receiving unit 21 first receives a print job from the terminal device 50 (Step 201). Here, it is assumed that the print job includes: a user ID which is identification information on a user who provides an instruction of print; the size of sheets on which the print is performed; a classification indicating whether the print is performed in color or monochrome; and the like.

Next, the print controller 25 determines whether the print is started by execution of the print job (Step 205). Since the print job received by the receiving unit 21 is delivered to an image processor (not shown) and the image forming unit 17 (see FIG. 2) through the print controller 25, the print controller 25 recognizes a status indicating whether the print is started. Thus, the print controller 25 makes the determination in Step 205 on the basis of this status.

As a result, if it is determined that the print is started, the processing is finished.

On the other hand, if it is determined that the print has not been started yet because of a print standby or the like, the print controller 25 determines whether an instruction to cancel the print job is provided (Step 206). In the first exemplary embodiment, it is assumed that cancel of a print job is also made through the terminal device 50. Thus, in Step 206, the print controller 25 determines whether the receiving unit 21 receives cancel instruction information.

If it is not determined that an instruction to cancel the print job is provided, the processing returns to Step 205. Then, the print controller 25 repeats the determination in Step 206 until the print is started.

If it is determined that an instruction to cancel the print job is provided before the print is started, the print controller 25 cancels the print job (Step 207). That is, the print controller 25 causes the print job received by the receiving unit 21 to disappear and performs control so that the print job is not delivered to the image processor (not shown) and the image forming unit 17 (see FIG. 2).

Next, the counter updating unit 27 calculates the number of sheets that are supposed to be printed if the canceled print job is executed (Step 209). Here, the number of sheets may be calculated on the basis of the number of pages of document data to be printed and print setting of the print job. For example, suppose that the number of pages of document data is ten, and duplex print and setting by which two pages of the document data are put together in one face of a sheet are designated in the print job. Then, the number of sheets is three.

The counter updating unit 27 then counts up the value of the printed document reducing counter stored in the counter memory 28 by the number of sheets calculated in Step 209 (Step 210). Since the print job includes a user ID, the size of sheets and a classification of color or monochrome, this count up may be performed for each of these attributions.

Subsequently, the counter updating unit 27 calculates the number of staple needles that are supposed to be used if the canceled print job is executed (Step 211). Here, the number of staple needles may be calculated on the basis of setting about stable binding in the print job. For example, suppose that staple binding for each of copies and staple binding at two positions on one edge of the sheets are designated in the print job. Then, the number of staple needles is two.

The counter updating unit 27 then counts up the value of the staple needle reducing counter stored in the counter memory 28 by the number of staple needles calculated in Step 211 (Step 212). Since the print job includes a user ID, the size of sheets and a classification of color or monochrome, this count up may be performed for each of these attributions.

After that, the counter informing unit 29 informs a user of the value of the printed document reducing counter and the value of the staple needle reducing counter that are stored in the counter memory 28 (Step 213). In this case, various methods are conceivable as a method to inform a user of the values of the counters. Firstly, there is a method in which a document with the values of the counters printed thereon is outputted as a counter report when a user provides an instruction through the operation panel 15 (see FIG. 2). Secondly, there is a method in which the values of the counters are outputted to the aggregate server 30, so that an aggregate result by the aggregate server 30 may be acquired from the terminal device 50. Thirdly, there is a method in which an application program to refer to the values of the counters is operated in the terminal device 50, so that the values of the counters may be referred to through this application program.

In this operation example, the number of sheets is calculated in Step 209, and the count up by the number of sheets is made in Step 210. However, the number of faces of sheets may be used instead of the number of sheets. The number of faces herein is not the number of faces of an electronic document, but the number of faces of sheets. That is, the number of faces obtained by counting the front and rear faces of a sheet individually is the number of faces of sheets. The number of faces of sheets may also be calculated on the basis of the number of pages of document data to be printed and print setting of the print job. For example, suppose that the number of pages of document data is ten, and duplex print and setting by which two pages of the document data are put together in one face of a sheet are designated in the print job. Then, the number of faces of sheets is five.

The description of the first exemplary embodiment is now finished.

In the first exemplary embodiment, staple needles are taken as an example of consumption material other than sheets, and a description is given of processing to count the number of staple needles whose use has been restrained. However, the present invention is not limited to this. For example, other metal pieces used for bookbinding or adhesive material, such as paste and adhesive tapes, may be regarded as consumption material other than sheets, and the number of metal pieces or the amount of adhesive material whose use has been restrained may be recorded. Instead, image forming material such as toner may be regarded as consumption material other than sheets, and the amount of image forming material whose use has been restrained may be recorded.

Additionally, although both of the printed document reducing counter and the staple needle reducing counter are counted up in the first exemplary embodiment, these counters may be configured so that at least any one of the counters counts up.

[Second Exemplary Embodiment]

The second exemplary embodiment is an exemplary embodiment in which a print job for stored and unprinted document data is canceled, in a case where the document data is stored in the image forming apparatus 10 after a user enters the print job into the image forming apparatus 10, the print job being an instruction to print the document data.

First, a description will be given of a functional configuration of the print management unit 20 according to the second exemplary embodiment.

Figure 5:
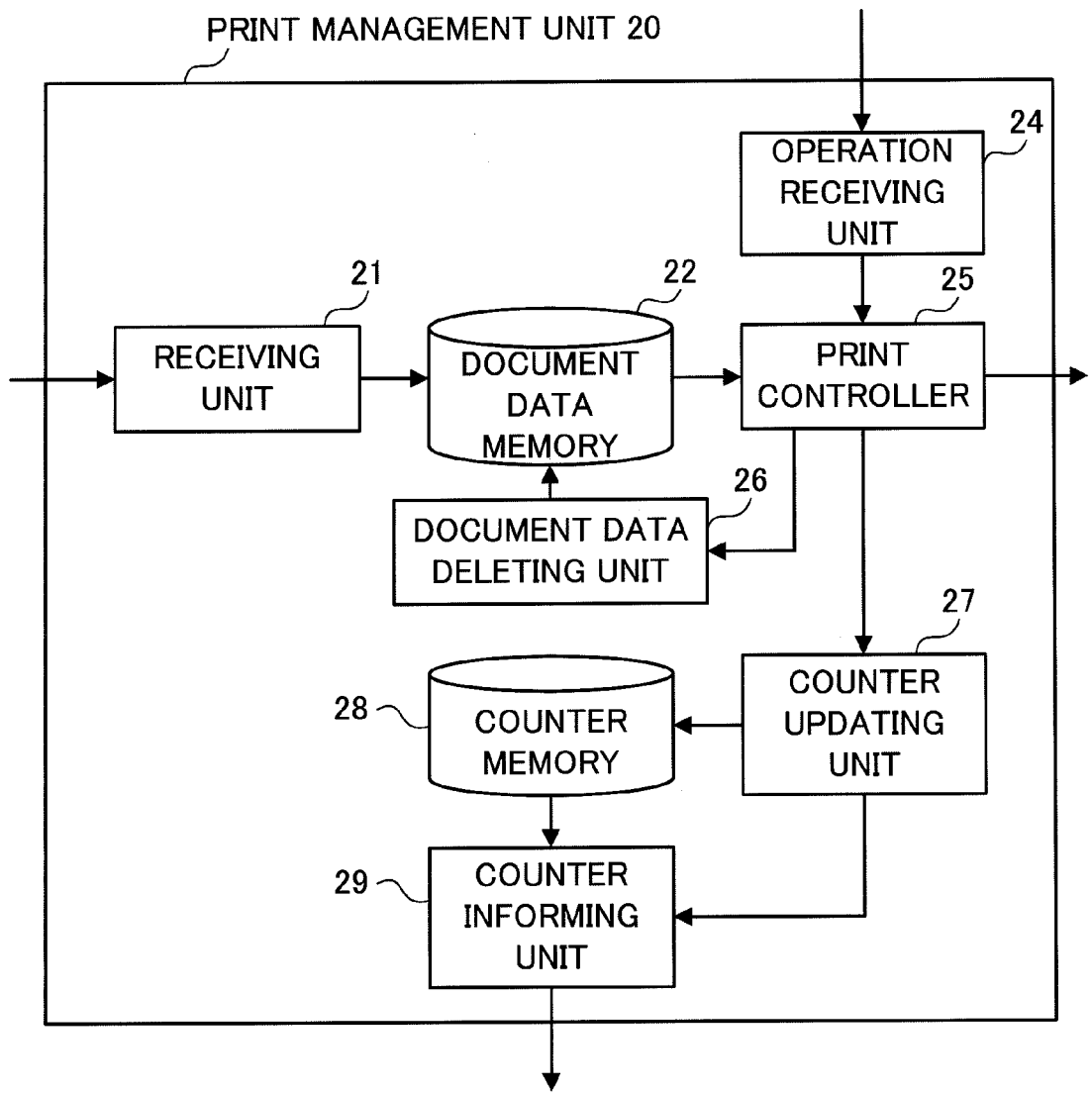
FIG. 5 is a block diagram showing an example of a functional configuration of the print management unit according to the second and third exemplary embodiments.

FIG. 5 is a block diagram showing an example of a functional configuration of the print management unit 20 according to the second exemplary embodiment.

As shown in FIG. 5, the print management unit 20 includes the receiving unit 21, a document data memory 22, an operation receiving unit 24, the print controller 25, a document data deleting unit 26, the counter updating unit 27, the counter memory 28 and the counter informing unit 29. Among these, the document data memory 22 and the counter memory 28 is implemented by the HDD 14 (see FIG. 2), for example. The receiving unit 21, the operation receiving unit 24, the print controller 25, the document data deleting unit 26, the counter updating unit 27 and the counter informing unit 29 are achieved by the CPU 11 (see FIG. 2) loading a program stored in the ROM 13 (see FIG. 2) into the RAM 12 (see FIG. 2) and executing the program.

The receiving unit 21 receives a print job from the terminal device 50. The print job herein is a unit of processing executed in the image forming apparatus 10 on the basis of print instruction information that is an instruction to print document data, as described in the first exemplary embodiment. In the present specification, the print instruction information may be referred to as print job. Additionally, the receiving unit 21 stores, in the document data memory 22, the document data of which an instruction of print is provided by the print job. In the second exemplary embodiment, the print job is used as an example of a print instruction, and the receiving unit 21 is provided as an example of a receiving unit that receives the print instruction.

The document data memory 22 stores, therein, the document data of which an instruction of print is provided by the print job until a user provides the instruction of the print through the operation panel 15 (see FIG. 2). In the second exemplary embodiment, the document data memory 22 is provided as an example of a memory that stores an electronic document.

The operation receiving unit 24 receives information on a user operation through the operation panel 15 (see FIG. 2). In particular, the operation receiving unit 24 may receive cancel instruction information that is an instruction to cancel a print job.

The print controller 25 controls print of document data by executing a print job for the document data stored in the document data memory 22. Additionally, if the operation receiving unit 24 receives cancel instruction information, the print controller 25 performs control so that the print job is canceled. In the second exemplary embodiment, the print controller 25 is provided as an example of a canceling unit that cancels print.

The document data deleting unit 26 deletes document data if a print job for the document data stored in the document data memory 22 is canceled. In the second exemplary embodiment, the document data deleting unit 26 is provided as an example of a deleting unit that deletes an electronic document.

The counter updating unit 27 updates the value of a stored document reducing counter stored in the counter memory 28, if a print job is canceled. In the second exemplary embodiment, the counter updating unit 27 is provided as an example of a recording unit that records the number of recording media or the number of faces of recording media, print on the recording media being canceled.

The counter memory 28 stores, therein, the value of the stored document reducing counter. The stored document reducing counter is a memory area for counting the number of recording media or the number of faces of recording media whose consumption has been restrained by canceling a print job in a state where document data is stored.

The counter informing unit 29 informs external devices of the value of the stored document reducing counter stored in the counter memory 28. In the second exemplary embodiment, the counter informing unit 29 is provided as an example of an outputting unit that outputs information on the number of recording media or the number of faces of recording media.

Next, a description will be given of an operation of the print management unit 20 according to the second exemplary embodiment.

Figure 6:
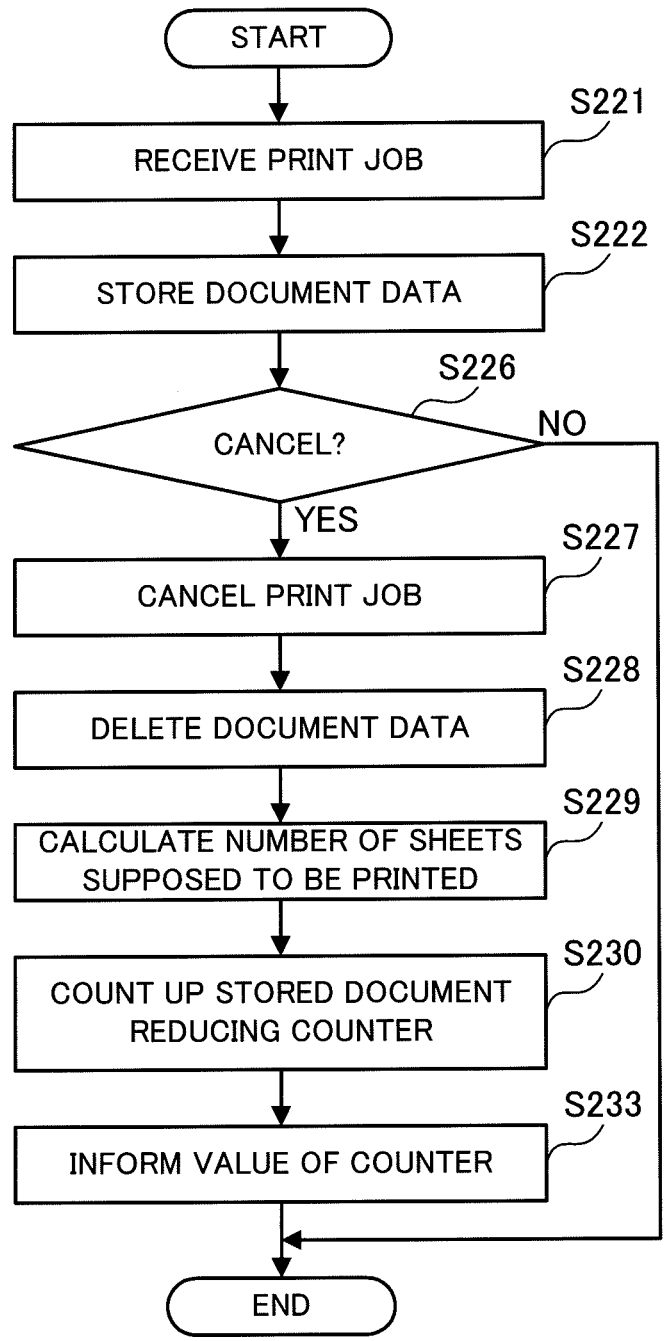
FIG. 6 is a flowchart showing an operation example of the print management unit according to the second exemplary embodiment.

FIG. 6 is a flowchart showing an operation example of the print management unit 20 according to the second exemplary embodiment. In this operation example, sheets are used as the recording media, and the number of sheets is counted by the stored document reducing counter.

In the print management unit 20, the receiving unit 21 first receives a print job from the terminal device 50 (Step 221). Here, it is assumed that the print job includes: a user ID which is identification information on a user who provides an instruction of print; the size of sheets on which the print is performed; a classification indicating whether the print is performed in color or monochrome; and the like. The receiving unit 21 stores, in the document data memory 22, the document data of which an instruction of print is provided by the print job (Step 222).

Next, the print controller 25 determines whether an instruction to cancel a print job for specific document data in the document data memory 22 is provided (Step 226). In the second exemplary embodiment, it is assumed that cancel of a print job is made through the operation panel 15 (see FIG. 2). Thus, in Step 226, the print controller 25 determines whether the operation receiving unit 24 receives cancel instruction information.

As a result, if it is not determined that an instruction to cancel the print job is provided, the processing is finished.

On the other hand, if it is determined that an instruction to cancel the print job is provided, the print controller 25 cancels the print job (Step 227). That is, the print controller 25 causes the print job for the above-mentioned specific document data to disappear and performs control so that the print job is not delivered to the image processor (not shown) and the image forming unit 17 (see FIG. 2). Then, the document data deleting unit 26 deletes the above-mentioned specific document data in the document data memory 22 (Step 228).

Next, the counter updating unit 27 calculates the number of sheets that are supposed to be printed if the canceled print job is executed (Step 229). Here, the number of sheets may be calculated on the basis of the number of pages of document data to be printed and print setting of the print job. For example, suppose that the number of pages of document data is ten, and duplex print and setting by which two pages of the document data are put together in one face of a sheet are designated in the print job. Then, the number of sheets is three.

The counter updating unit 27 then counts up the value of the stored document reducing counter stored in the counter memory 28 by the number of sheets calculated in Step 229

(Step 230). Since the print job includes a user ID, the size of sheets and a classification of color or monochrome, this count up may be performed for each of these attributes.

After that, the counter informing unit 29 informs a user of the value of the stored document reducing counter stored in the counter memory 28 (Step 233). In this case, various methods are conceivable as a method to inform a user of the value of the counter, as described in the first exemplary embodiment.

In this operation example, the number of sheets is calculated in Step 229, and the count up by the number of sheets is made in Step 230. However, the number of faces of sheets may be used instead of the number of sheets. The number of faces herein is not the number of faces of an electronic document, but the number of faces of sheets. That is, the number of faces obtained by counting the front and rear faces of a sheet individually is the number of faces of sheets. The number of faces of sheets may also be calculated on the basis of the number of pages of document data to be printed and print setting of the print job. For example, suppose that the number of pages of document data is ten, and duplex print and setting by which two pages of the document data are put together in one face of a sheet are designated in the print job. Then, the number of faces of sheets is five.

The description of the second exemplary embodiment is now finished.

In the second exemplary embodiment, it is not mentioned which of the following cases is assumed: a case where document data that has never been printed and is stored is deleted; or a case where document data that has already been printed but is still stored for additional print or the like is deleted.

Among these cases, the former case results in restraint of print of document data on recording media. Thus, it is natural to count up the stored document reducing counter. Accordingly, the second exemplary embodiment may be regarded as an exemplary embodiment for document data that has never been printed and is stored.

On the other hand, in the latter case, since document data that has already been printed is deleted, it may be considered that the latter case does not make a large contribution to restraint of print of document data on recording media. Accordingly, the stored document reducing counter may be configured so as not to count up in such a case. Specifically, for each piece of stored document data, a flag is provided to indicate whether the corresponding piece of document data has already been printed. The stored document reducing counter may be configured so as not to count up when document data is deleted, if the flag corresponding to the document data indicates that the document data has already been printed.

Additionally, although only the stored document reducing counter is counted up in the second exemplary embodiment, the printed document reducing counter of the first exemplary embodiment and a counter for consumption material such as the staple needle reducing counter of the first exemplary embodiment may also be counted up, in addition to the stored document reducing counter.

Furthermore, in the second exemplary embodiment, it is assumed that stored document data is deleted by a user operation. However, deletion by a user operation may not be assumed. For example, the stored document reducing counter may be counted up, even in a case where the document data deleting unit 26 automatically deletes document data whose storing period has passed. Here, the storing period is an example of a predetermined time period. Instead, the stored document reducing counter may be counted up, when the document data deleting unit 26 automatically deletes document data because free space in the document data memory 22 has decreased.

[Third Exemplary Embodiment]

The third exemplary embodiment is an exemplary embodiment in which a print job for stored document data is canceled during print of the document data, in a case where the document data is stored in the image forming apparatus 10 after a user enters the print job into the image forming apparatus 10, the print job being an instruction to print the document data.

First, a functional configuration of the print management unit 20 according to the third exemplary embodiment is the same as that of the print management unit 20 according to the second exemplary embodiment. Thus, a description thereof is omitted.

Next, a description will be given of an operation of the print management unit 20 according to the third exemplary embodiment.

Figure 7:
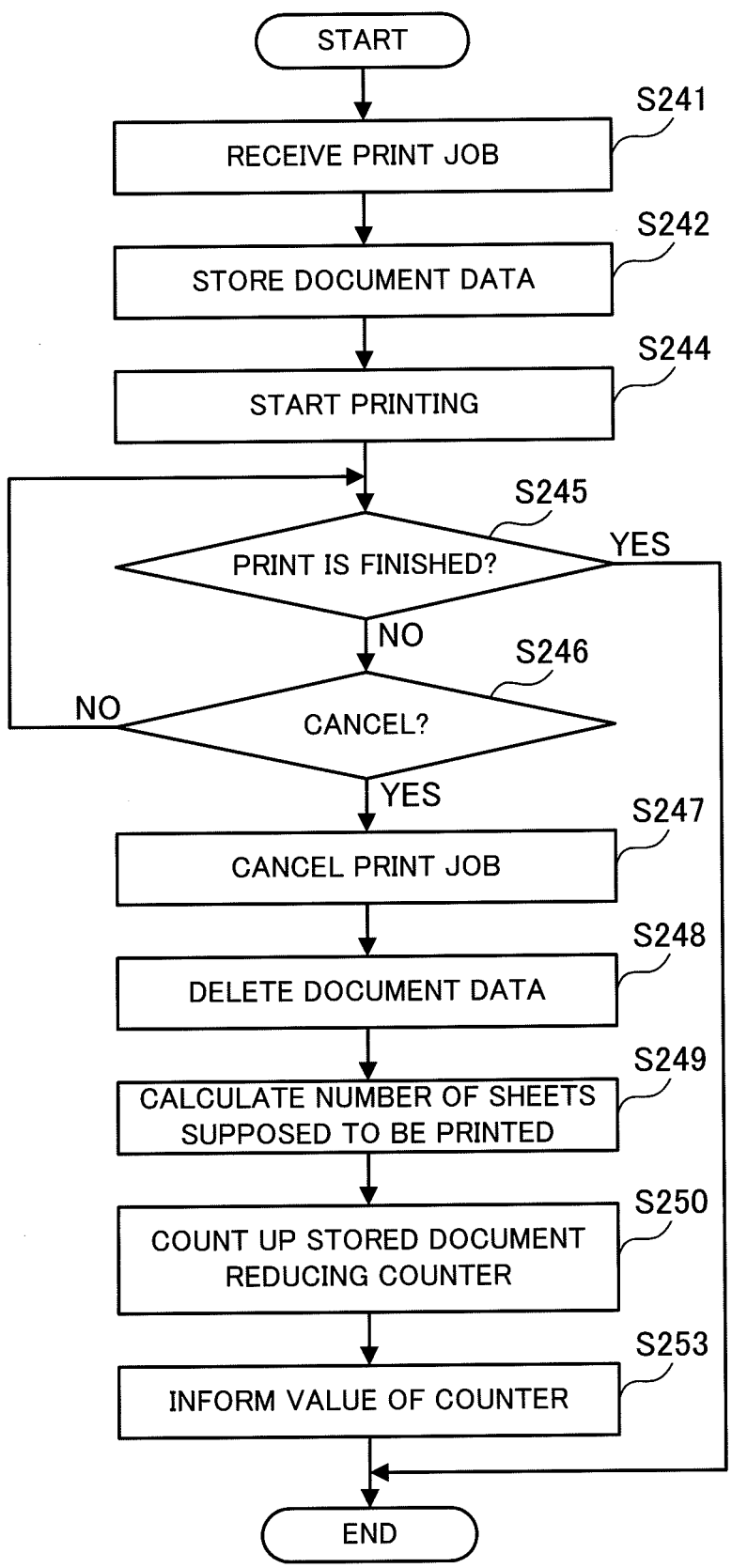
FIG. 7 is a flowchart showing an operation example of the print management unit according to the third exemplary embodiment.

FIG. 7 is a flowchart showing an operation example of the print management unit 20 according to the third exemplary embodiment. In this operation example, sheets are used as the recording media, and the number of sheets is counted by the stored document reducing counter.

In the print management unit 20, the receiving unit 21 first receives a print job from the terminal device 50 (Step 241). Here, it is assumed that the print job includes: a user ID which is identification information on a user who provides an instruction of print; the size of sheets on which the print is performed; a classification indicating whether the print is performed in color or monochrome; and the like. The receiving unit 21 stores, in the document data memory 22, the document data of which an instruction of print is provided by the print job (Step 242).

Next, the print controller 25 executes a print job for specific document data in the document data memory 22, thereby to start printing the document data (Step 244). The print controller 25 then determines whether print of the document data is finished (Step 245). Since the print job received by the receiving unit 21 is delivered to the image processor (not shown) and the image forming unit 17 (see FIG. 2) through the print controller 25, the print controller 25 recognizes a status indicating whether the print is finished. Thus, the print controller 25 makes the determination in Step 245 on the basis of this status.

As a result, if it is determined that the print is finished, the processing is finished.

On the other hand, if it is determined that the print has not been finished yet, the print controller 25 determines whether an instruction to cancel the print job for the above-mentioned specific document data is provided (Step 246). In the third exemplary embodiment, it is assumed that cancel of a print job is made through the operation panel 15 (see FIG. 2). Thus, in Step 246, the print controller 25 determines whether the operation receiving unit 24 receives cancel instruction information.

If it is not determined that an instruction to cancel the print job for the above-mentioned specific document data is provided, the processing returns to Step 245. Then, the print controller 25 repeats the determination in Step 246 until the print of the above-mentioned specific document data is finished.

If it is determined that an instruction to cancel the print job for the above-mentioned specific document data is provided before the print of the document data is finished, the print controller 25 cancels the print job (Step 247). That is, the print controller 25 causes the print job for the above-mentioned specific document data to disappear and controls the image processor (not shown) and the image forming unit 17 (see FIG. 2) so that these units do not execute the print job delivered thereto. Then, the document data deleting unit 26 deletes the above-mentioned specific document data in the document data memory 22 (Step 248).

Next, the counter updating unit 27 calculates the number of sheets that are supposed to be printed if the canceled print job is executed (Step 249). Here, the number of sheets may be calculated on the basis of the number of pages of document data to be printed and print setting of the print job. For example, suppose that the number of pages of document data is ten, and duplex print and setting by which two pages of the document data are put together in one face of a sheet are designated in the print job. Then, the number of sheets is three.

The counter updating unit 27 then counts up the value of the stored document reducing counter stored in the counter memory 28 by the number of sheets calculated in Step 249 (Step 250). Since the print job includes a user ID, the size of sheets and a classification of color or monochrome, this count up may be performed for each of these attributions.

In Step 249, the number of sheets designated by the print job, namely, a total number of the number of printed sheets and the number of sheets, print of which is canceled, is calculated. Then, in Step 250, the value of the stored document reducing counter is counted up by this calculated total number. For example, suppose that the number of sheets on which document data is supposed to be printed is ten. Then, even if the print job is canceled at a time point when the sixth sheet is printed, the stored document reducing counter is counted up by ten, which is the number of sheets on which print is supposed to be performed.

Instead, in Step 249, the number of sheets, print of which is canceled, namely, a number obtained by subtracting the number of printed sheets from the number of sheets designated by the print job may be calculated. Then, in Step 250, the value of the stored document reducing counter may be counted up by this calculated number. In this case, for example, if the number of sheets on which document data is supposed to be printed is ten and if the print job is canceled at a time point when the sixth sheet is printed, then the stored document reducing counter is counted up by four, which is the number of sheets, print of which is canceled.

After that, the counter informing unit 29 informs a user of the value of the stored document reducing counter stored in the counter memory 28 (Step 253). In this case, various methods are conceivable as a method to inform a user of the value of the counter, as described in the first exemplary embodiment.

In this operation example, the number of sheets is calculated in Step 249, and the count up by the number of sheets is made in Step 250. However, the number of faces of sheets may be used instead of the number of sheets. The number of faces herein is not the number of faces of an electronic document, but the number of faces of sheets. That is, the number of faces obtained by counting the front and rear faces of a sheet individually is the number of faces of sheets. The number of faces of sheets may also be calculated on the basis of the number of pages of document data to be printed and print setting of the print job. For example, suppose that the number of pages of document data is ten, and duplex print and setting by which two pages of the document data are put together in one face of a sheet are designated in the print job. Then, the number of faces of sheets is five.

The description of the third exemplary embodiment is now finished.

The third exemplary embodiment avoids the following impropriety: when a print job having a large number of prints is canceled at an initial stage during the print, a large number of print outputs are restrained; however, this result is not reflected unless the stored document reducing counter is counted up. Accordingly, the print management unit 20 may employ a configuration in which the stored document reducing counter is counted up only if one of the following conditions or the like is satisfied: the number of sheets on which print is supposed to be performed is larger than a threshold value Th1 and the number of printed sheets is smaller than a threshold value Th2 (where Th1>Th2); or a ratio of the number of printed sheets to the number of sheets on which print is supposed to be performed is smaller than a threshold value Th3.

Additionally, although only the stored document reducing counter is counted up in the third exemplary embodiment, the printed document reducing counter of the first exemplary embodiment and a counter for consumption material such as the staple needle reducing counter of the first exemplary embodiment may also be counted up, in addition to the stored document reducing counter.

Furthermore, in the third exemplary embodiment, it is assumed that stored document data is deleted by a user operation. However, deletion by a user operation may not be assumed. For example, the stored document reducing counter may be counted up, even in a case where the document data deleting unit 26 automatically deletes document data whose storing period has passed. Here, the storing period is an example of a predetermined time period. Instead, the stored document reducing counter may be counted up, when the document data deleting unit 26 automatically deletes document data because free space in the document data memory 22 has decreased.

[Fourth Exemplary Embodiment]

The fourth exemplary embodiment is an exemplary embodiment in which an instruction to print document data is provided to store the document data in the image forming apparatus 10 once; however the document data is deleted when a user has no intention of printing the document data because the document data is stored by an operation error or the like, or when there is a need to modify the document data after the document data is stored.

First, a description will be given of a functional configuration of the print management unit 20 according to the fourth exemplary embodiment.

Figure 8:
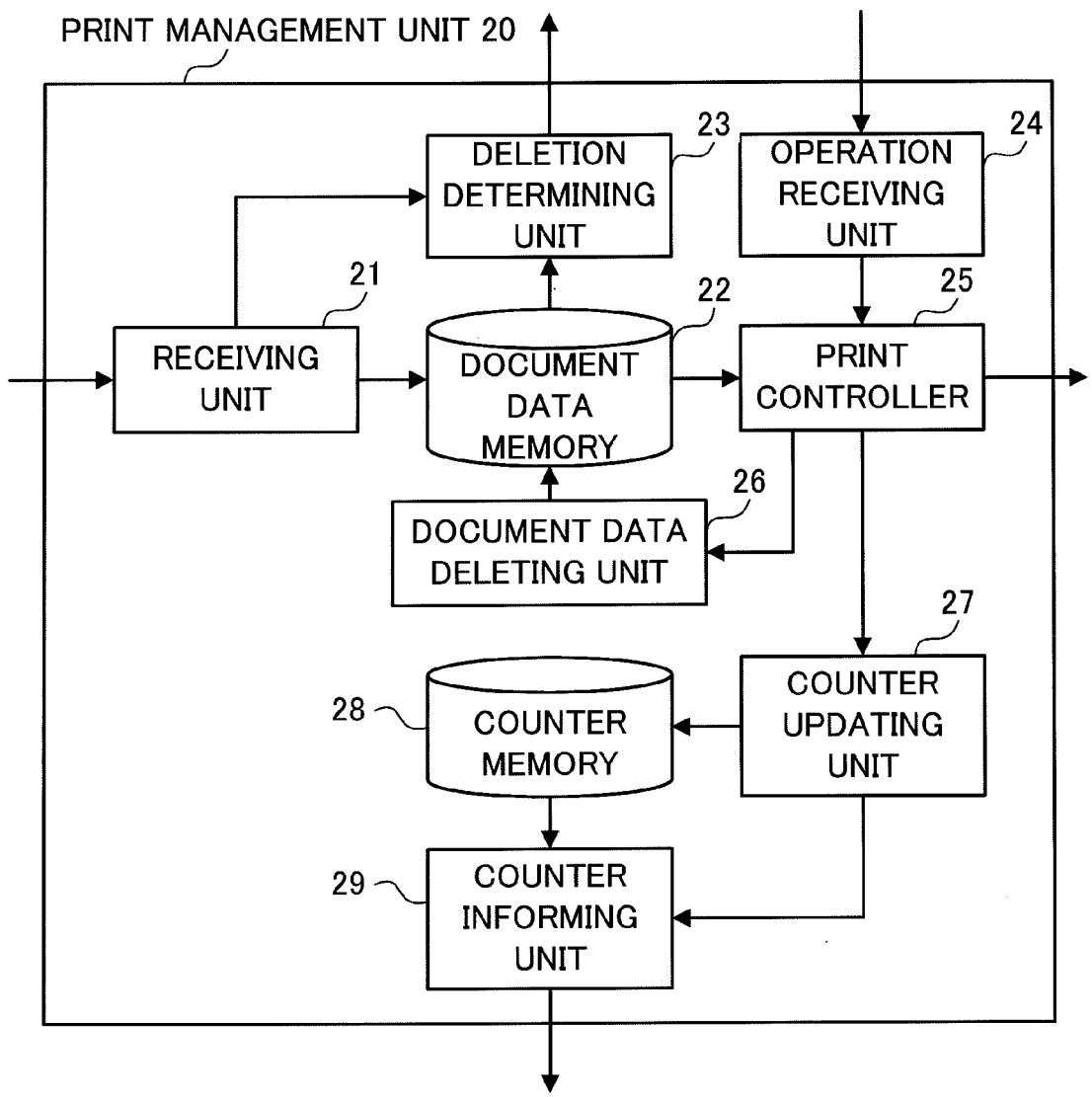
FIG. 8 is a block diagram showing an example of a functional configuration of the print management unit according to the fourth exemplary embodiment.

FIG. 8 is a block diagram showing an example of a functional configuration of the print management unit 20 according to the fourth exemplary embodiment.

As shown in FIG. 8, the print management unit 20 includes the receiving unit 21, the document data memory 22, a deletion determining unit 23, the operation receiving unit 24, the print controller 25, the document data deleting unit 26, the counter updating unit 27, the counter memory 28 and the counter informing unit 29. Among these, the document data memory 22 and the counter memory 28 are implemented by the HDD 14 (see FIG. 2), for example. The receiving unit 21, the deletion determining unit 23, the operation receiving unit 24, the print controller 25, the document data deleting unit 26, the counter updating unit 27 and the counter informing unit 29 are achieved by the CPU 11 (see FIG. 2) loading a program stored in the ROM 13 (see FIG. 2) into the RAM 12 (see FIG. 2) and executing the program.

The receiving unit 21 receives a print job from the terminal device 50. The print job herein is a unit of processing executed in the image forming apparatus 10 on the basis of print instruction information that is an instruction to print document data, as described in the first exemplary embodiment. In the present specification, the print instruction information may be referred to as print job. Additionally, the receiving unit 21 stores, in the document data memory 22, the document data of which an instruction of print is provided by the print job. In the fourth exemplary embodiment, the print job is used as an example of a print instruction, and the receiving unit 21 is provided as an example of a receiving unit that receives the print instruction.

The document data memory 22 stores, therein, the document data of which an instruction of print is provided by the print job until a user provides an instruction of print through the operation panel 15 (see FIG. 2).

The deletion determining unit 23 determines whether the following document data has already been stored in the document data memory 22: document data of which an instruction of print is provided by the same user as the one who provides an instruction to print document data newly stored in the document data memory 22; and document data based on the same document as that of the newly stored document data. If such document data has already been stored, the deletion determining unit 23 inquires whether the document data is made to be deleted. In the fourth exemplary embodiment, the deletion determining unit 23 is provided as an example of an inquiring unit that inquires whether or not deletion of any one of plural electronic documents is allowed.

The operation receiving unit 24 receives information on a user operation through the operation panel 15 (see FIG. 2). In particular, the operation receiving unit 24 may receive document data deleting instruction information inputted in response to an inquiry made by the deletion determining unit 23.

The print controller 25 controls print of document data by executing a print job for the document data stored in the document data memory 22. Additionally, if the operation receiving unit 24 receives document data deleting instruction information that is an instruction to delete document data, the print controller 25 performs control so that the print job for the document data is canceled. In the fourth exemplary embodiment, the print controller 25 is provided as an example of a canceling unit that cancels print.

The document data deleting unit 26 deletes document data if a print job for the document data stored in the document data memory 22 is canceled. In the fourth exemplary embodiment, the document data deleting unit 26 is provided as an example of a deleting unit that deletes an electronic document.

The counter updating unit 27 updates the value of the stored document reducing counter stored in the counter memory 28, if a print job is canceled. In the fourth exemplary embodiment, the counter updating unit 27 is provided as an example of a recording unit and a first recording unit that record the number of recording media or the number of faces of recording media, print on the recording media being canceled.

The counter memory 28 stores, therein, the value of the stored document reducing counter. The stored document reducing counter is a memory area for counting the number of recording media or the number of faces of recording media whose consumption has been restrained by canceling a print job in a state where document data is stored.

The counter informing unit 29 informs external devices of the value of the stored document reducing counter stored in the counter memory 28. In the fourth exemplary embodiment, the counter informing unit 29 is provided as an example of an outputting unit that outputs information on the number of recording media or the number of faces of recording media.

Next, a description will be given of an operation of the print management unit 20 according to the fourth exemplary embodiment.

Figure 9:
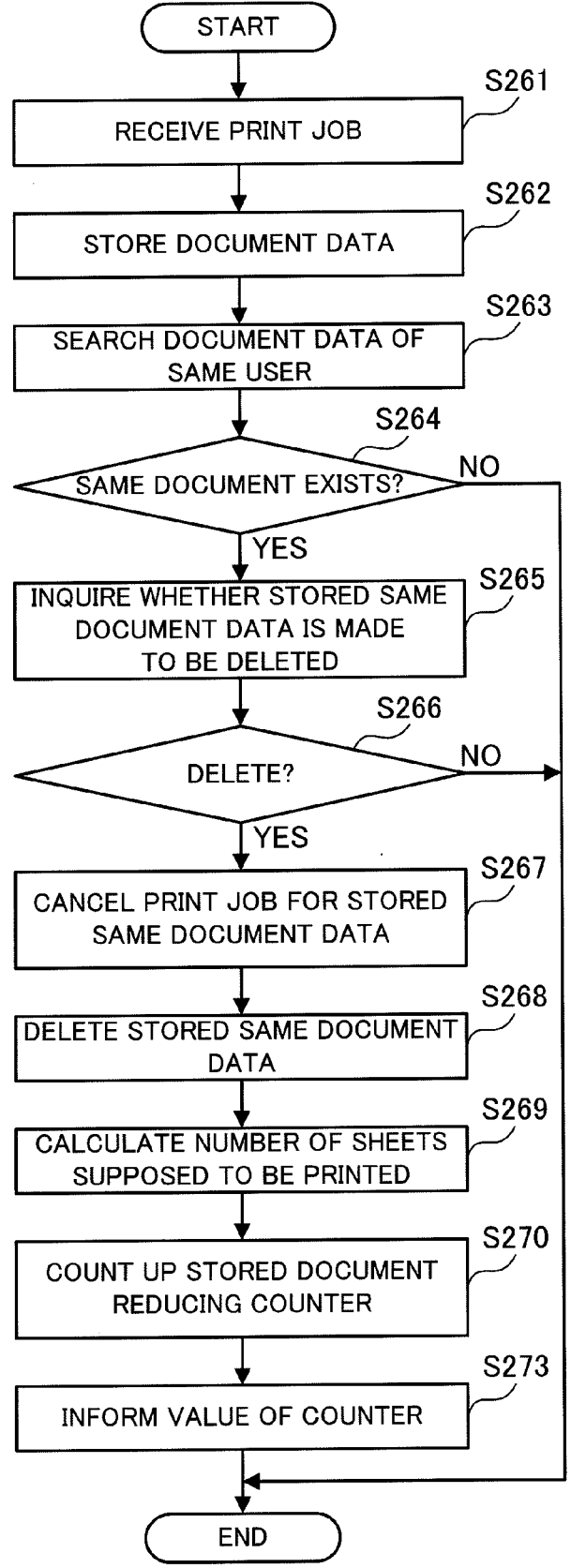
FIG. 9 is a flowchart showing an operation example of the print management unit according to the fourth exemplary embodiment.

FIG. 9 is a flowchart showing an operation example of the print management unit 20 according to the fourth exemplary embodiment. In this operation example, sheets are used as the recording media, and the number of sheets is counted by the stored document reducing counter.

In the print management unit 20, the receiving unit 21 first receives a print job from the terminal device 50 (Step 261). Here, it is assumed that the print job includes: a user ID which is identification information on a user who provides an instruction of print; the size of sheets on which the print is performed; a classification indicating whether the print is performed in color or monochrome; and the like. The receiving unit 21 stores, in the document data memory 22, the document data of which an instruction of print is provided by the print job (Step 262).

Next, the deletion determining unit 23 searches the document data memory 22 for document data that is stored because a user who has provided an instruction to print the document data newly stored in Step 262 provided an instruction of print in the past (Step 263). When the search has succeeded, the deletion determining unit 23 determines whether the searched document data is document data (hereinafter, referred to as "stored same document data") based on the same document as that of the document data newly stored in Step 262 (Step 264). Such determination is made because there are plural pieces of document data based on the same document if document data having been stored once is modified and the modified document data is also stored, for example. Here, the determination whether the searched document data is the stored same document data may be made by determining whether the whole of or a part of the names of document data is the same, for example.

If it is determined that the searched document data is the stored same document data in Step 264, the deletion determining unit 23 inquires whether the stored same document data is made to be deleted, through the operation panel 15 (see FIG. 2), for example (Step 265).

Then, the print controller 25 determines whether an instruction to delete the stored same document data is provided (Step 266). In the fourth exemplary embodiment, it is assumed that deletion of document data is made through the operation panel 15 (see FIG. 2). Thus, in Step 266, the print controller 25 determines whether the operation receiving unit 24 receives document data deleting instruction information.

As a result, if it is determined that an instruction to delete the stored same document data is provided, the print controller 25 cancels the print job for the stored same document data (Step 267). That is, the print controller 25 causes the print job for the stored same document data to disappear and performs control so that the print job is not delivered to the image processor (not shown) and the image forming unit 17 (see FIG. 2). Then, the document data deleting unit 26 deletes the stored same document data in the document data memory 22 (Step 268).

Next, the counter updating unit 27 calculates the number of sheets that are supposed to be printed if the canceled print job is executed (Step 269). Here, the number of sheets may be calculated on the basis of the number of pages of document data to be printed and print setting of the print job. For example, suppose that the number of pages of document data is ten, and duplex print and setting by which two pages of the document data are put together in one face of a sheet are designated in the print job. Then, the number of sheets is three.

The counter updating unit 27 then counts up the value of the stored document reducing counter stored in the counter memory 28 by the number of sheets calculated in Step 269 (Step 270). Since the print job includes a user ID, the size of sheets and a classification of color or monochrome, this count up may be performed for each of these attributes.

After that, the counter informing unit 29 informs a user of the value of the stored document reducing counter stored in the counter memory 28 (Step 273). In this case, various methods are conceivable as a method to inform a user of the value of the counter, as described in the first exemplary embodiment.

In this operation example, the number of sheets is calculated in Step 269, and the count up by the number of sheets is made in Step 270. However, the number of faces of sheets may be used instead of the number of sheets. The number of faces herein is not the number of faces of an electronic document, but the number of faces of sheets. That is, the number of faces obtained by counting the front and rear faces of a sheet individually is the number of faces of sheets. The number of faces of sheets may also be calculated on the basis of the number of pages of document data to be printed and print setting of the print job. For example, suppose that the number of pages of document data is ten, and duplex print and setting by which two pages of the document data are put together in one face of a sheet are designated in the print job. Then, the number of faces of sheets is five.

The description of the fourth exemplary embodiment is now finished.

In the fourth exemplary embodiment, when document data is newly stored, determination is made whether plural pieces of document data based on the same document have come to be stored. However, the present invention is not limited to this. For example, when document data is newly stored, determination is made whether plural pieces of document data that are associated with each other have come to be stored.

Additionally, although only the stored document reducing counter is counted up in the fourth exemplary embodiment, the printed document reducing counter of the first exemplary embodiment and a counter for consumption material such as the staple needle reducing counter of the first exemplary embodiment may also be counted up, in addition to the stored document reducing counter.

[Counter]

FIG. 10 is a table showing a specific example of values of the counters recorded in the above-mentioned first to fourth exemplary embodiments. In the above-mentioned first to fourth exemplary embodiments, a print job includes a user ID, the size of sheets and a classification of color or monochrome, and the count is performed for each of these attributions. Thus, FIG. 10 also shows a counter that records counted values for each user ID, each size of sheets and each classification of color or monochrome.

Since any one of the printed document reducing counter, the staple needle reducing counter and the stored document reducing counter has the same format, FIG. 10 shows only one format. However, for the printed document reducing counter and the stored document reducing counter, the counted value is the number of recording media or the number of faces of recording media. Meanwhile, for the staple needle reducing counter, the counted value is the number of staple needles.

[Aggregate Server]

Various methods are conceivable as a method to inform a user of the values of the above-mentioned counters, as described above. Among these, there is a method in which the aggregate server 30 aggregates the values of the counters of each image forming apparatus 10, and provides the result to each terminal device 50.

Thus, a description will be given of the aggregate server 30 that is an example of an information aggregate device performing such an operation.

Figure 11:
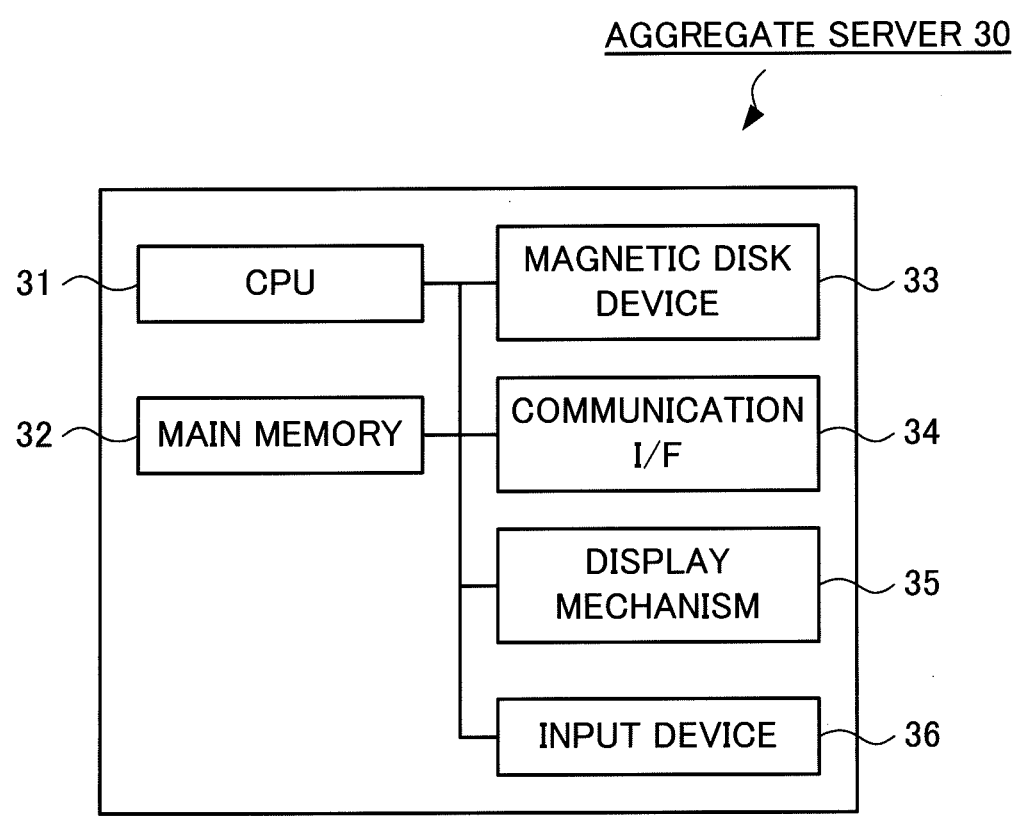
FIG. 11 is a diagram showing a configuration example of the aggregate server to which the exemplary embodiments of the present invention are applied.

FIG. 11 is a diagram showing an example of a hardware configuration of the aggregate server 30.

As shown in FIG. 11, the aggregate server 30 includes a central processing unit (CPU) 31, a main memory 32 and a magnetic disk device (HDD: Hard Disk Drive) 33. Here, the CPU 31 executes an operating system (OS) and various kinds of software such as application, and achieves various functions to be described below. The main memory 32 is a memory area that stores various kinds of software, data used for executing the software, and the like. The magnetic disk device 33 is a memory area that stores input data to various kinds of software, output data from various kinds of software, and the like.

Furthermore, the aggregate server 30 includes a communication interface 34 (denoted by "communication I/F" in FIG. 11) that performs communication with external devices, a display mechanism 35 including a video memory, a display and the like, and an input device 36 such as a keyboard, a mouse or the like.

Next, a description will be given of a functional configuration of the aggregate server 30 according to the first to fourth exemplary embodiments.

Figure 12:
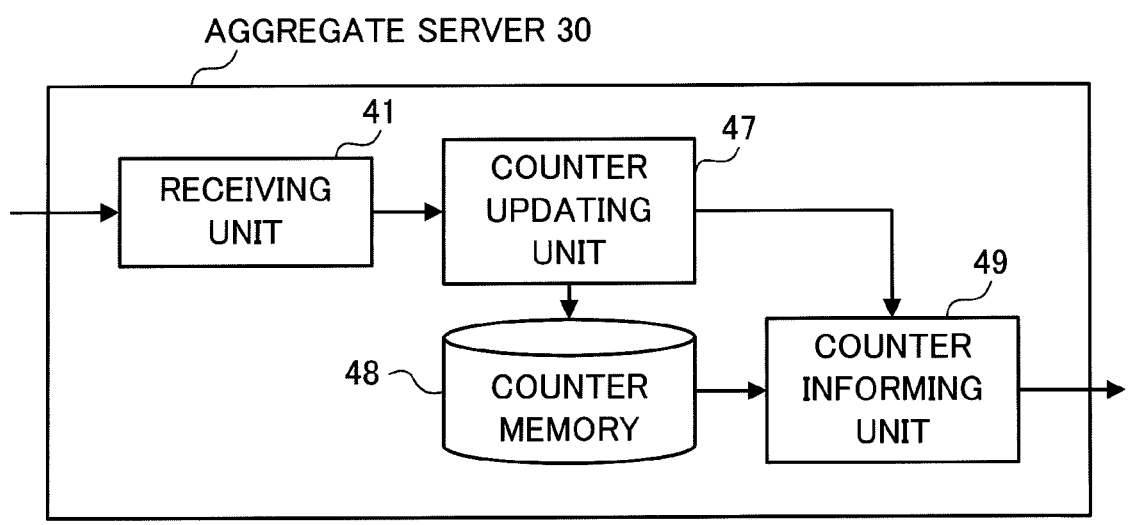
FIG. 12 is a block diagram showing an example of a functional configuration of the aggregate server according to the exemplary embodiments of the present invention.

FIG. 12 is a block diagram showing an example of a functional configuration of the aggregate server 30 according to the first to fourth exemplary embodiments.

As shown in FIG. 12, the aggregate server 30 includes a receiving unit 41, a counter updating unit 47, a counter memory 48 and a counter informing unit 49. Among these, the counter memory 48 is implemented by the magnetic disk device 33 (see FIG. 11), for example. The receiving unit 41, the counter updating unit 47 and the counter informing unit 49 are achieved by the CPU 31 (see FIG. 11) loading a program stored in the magnetic disk device 33 (see FIG. 11) into the main memory 32 (see FIG. 11) and executing the program.

The receiving unit 41 receives values of the printed document reducing counter, the stored document reducing counter and the staple needle reducing counter that are managed by each image forming apparatus 10. In the first to fourth exemplary embodiments, the receiving unit 41 is provided as an example of a reception unit that receives the number of recording media or the number of faces of recording media.

The counter updating unit 47 updates the values of the printed document reducing counter, the stored document reducing counter and the staple needle reducing counter that are stored in the counter memory 48, on the basis of the values of the printed document reducing counter, the stored document reducing counter and the staple needle reducing counter that are received by the receiving unit 41. In the first to fourth exemplary embodiments, the counter updating unit 47 is provided as an example of a second recording unit that records information obtained by aggregating the number of recording media or the number of faces of recording media.

The counter memory 48 stores, therein, an aggregate result of the values of the printed document reducing counter, the stored document reducing counter and the staple needle reducing counter.

The counter informing unit 49 informs external devices of the values of the printed document reducing counter, the stored document reducing counter and the staple needle reducing counter that are stored in the counter memory 48.

The aggregate server 30 operates in the following way.

Specifically, the receiving unit 41 first receives the values of the printed document reducing counter, the stored document reducing counter and the staple needle reducing counter from each image forming apparatus 10, and delivers the values to the counter updating unit 47.

The counter updating unit 47 then counts up the values of the printed document reducing counter, the stored document reducing counter and the staple needle reducing counter that are stored in the counter memory 48, by the values of the printed document reducing counter, the stored document reducing counter and the staple needle reducing counter that are delivered from the receiving unit 41, thereby to aggregate the values of the counters. Since the values of the counters are recorded for each user in the first to fourth exemplary embodiments, also here, aggregate for each user may be performed over the image forming apparatuses 10. Instead, it is conceivable that the receiving unit 41 receives, from each image forming apparatus 10, identification information of each image forming apparatus 10 together with the values of the counters, and the counter updating unit 47 aggregates for each image forming apparatus 10 by using this identification information.

After that, the counter informing unit 49 outputs, to the terminal devices 50, the values of the printed document reducing counter, the stored document reducing counter and the staple needle reducing counter that are stored in the counter memory 48, in response to a request from each terminal device 50.

The program that achieves the first to fourth exemplary embodiments may be provided not only by a communication unit but also by being stored in a recording medium such as a CD-ROM.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A print management device comprising:
   a receiving unit configured to receive a print instruction to perform printing of document data on recording media;
   a canceling unit configured to cancel the printing caused to be performed by the print instruction received by the receiving unit, in accordance with a canceling instruction of the print;
   a deleting unit configured to, in response to the printing caused be performed by the print instruction received by receiving unit being canceled, delete the document data;
   a recording unit configured to, in response to the printing caused to be performed by the print instruction received by the receiving unit being canceled by the canceling unit, record a number of the recording media or the number of faces of the recording media that, as a result of the canceling of the printing in accordance with the canceling instruction, will not be consumed, the number recorded by the recording unit being calculated on a basis of a number of the pages of the document data and a print setting in the print instruction; and
   an outputting unit configured to output information on the number of the recording media recorded by the recording unit or the number of faces of the recording media recorded by the recording unit that, as the result of the canceling of the printing in accordance with the cancelling instruction, will not be consumed.

2. The print management device according to claim 1, further comprising:
   a memory configured to store the document data in accordance with the print instruction received by the receiving unit,
   wherein
   in response to the printing on the recording media being canceled and deletion of the document data stored in the memory by the deleting unit, the recording unit is configured to record the number of the recording media or the number of faces of the recording media that, as a result of the canceling of the printing and the deletion of the document data by the deleting unit, will not be consumed.

3. The print management device according to claim 2, wherein in response to the document data deleted by the deleting unit having already been printed, the recording unit is configured to avoid recording the number of the recording media or the number of faces of the recording media.

4. The print management device according to claim 3, further comprising an inquiring unit configured to make an inquiry if the memory stores a plurality of document data associated with each other, the inquiry inquiring whether or not deletion of any one of the plurality of document data is allowed, wherein
   the deleting unit is configured to delete one document data in accordance with a deleting instruction of the one document data among the plurality of document data, the deleting instruction being provided in response to the inquiry made by the inquiring unit, and
   in response to the printing on the recording media being canceled and deletion of the one document data by the deleting unit, the recording unit is configured to record the number of the recording media or the number of faces of the recording media that, as the result of canceling of the printing and the deletion of the one document data by the deleting unit, will not be consumed.

5. The print management device according to claim 2, further comprising an inquiring unit configured to make an inquiry if the memory stores a plurality of document data associated with each other, the inquiry inquiring whether or not deletion of any one of the plurality of document data is allowed, wherein
   the deleting unit is configured to delete one document data in accordance with a deleting instruction of the one document data among the plurality of document data, the deleting instruction being provided in response to the inquiry made by the inquiring unit, and
   in response to the printing on the recording media being canceled and deletion of the one document data by the deleting unit, the recording unit is configured to record the number of the recording media or the number of faces of the recording media that, as the result of canceling of the printing and the deletion of the one document data by the deleting unit, will not be consumed.

6. The print management device according to claim 1, wherein in response to the printing caused to be performed by the print instruction received by the receiving unit being canceled during the printing by the canceling unit, the recording unit is configured to avoid recording a number of the recording media or a number of faces of the recording media on which the printing has already been performed, but is configured to record the number of the recording media or the number of faces of the recording media that, as a result of the canceling of the printing in accordance with the canceling instruction, will not be consumed.

7. The print management device according to claim 1, wherein in response to the printing caused to be performed by the print instruction received by the receiving unit being canceled by the canceling unit, the recording unit is configured to further record an amount of consumable material other than the recording media that, as a result of the canceling of the printing in accordance with the canceling instruction, will not be consumed.

8. The print management device according to claim 1, wherein the recording unit is configured to record a cumulative total number, for each operator, of the recording media or faces of the recording media that will not be consumed.

9. The print management device according to claim 1, wherein the outputting unit is configured to output the information outside of the print management device.

10. The print management device according to claim 1, wherein the number of faces of the recording media is determined by counting the front and rear faces of the recording media individually.

11. A print management device comprising:
a receiving unit configured to receive a print instruction to perform printing of document data on recording media;
a canceling unit configured to cancel the printing caused to be performed by the print instruction received by the receiving unit, in accordance with a canceling instruction to cancel the printing;
a deleting unit configured to, in response to the printing caused to be performed by the print instruction received by the receiving unit being canceled, delete the document data; and
an outputting unit configured to output in response to the printing caused to be performed by the print instruction received by the receiving unit being canceled during the printing by the canceling unit, information on a number of the recording media or a number of faces of the recording media that would have been consumed if the printing were not canceled but will not be consumed as a result of the canceling of the printing in accordance with the canceling instruction.

12. A print management device comprising:
a receiving unit configured to receive a print instruction to perform printing of document data on recording media;
a deleting unit configured to, in response to a predetermined time period elapsing after the document data is stored in a memory, delete the document data;
a recording unit configured to, in response to the printing on the recording media being canceled because of deletion of the document data by the deleting unit, record a number of the recording media or a number of faces of the recording media that, as a result of the printing on the recording media being canceled because of deletion of the document data by the deleting unit, will not be consumed, the number recorded by the recording unit being calculated on a basis of a number of pages of the document data and a print setting in the print instruction; and
an outputting unit configured to output information on the number of the recording media recorded by the recording unit or the number of faces of the recording media recorded by the recording unit that, as the result of the canceling of the printing in accordance with the canceling instruction, will not be consumed.

13. The print management device according to claim 12, wherein the outputting unit is configured to output the information outside of the print management device.

14. A print management system comprising:
a plurality of print management devices configured to manage printing of document data on recording media; and
an information aggregation device configured to aggregate information managed by the plurality of print management devices, wherein
each of the plurality of print management devices includes:
a receiving unit configured to receive a print instruction to perform printing of the document data on the recording media;
a canceling unit configured to cancel the printing caused to be performed by the print instruction received by the receiving unit, in accordance with a canceling instruction to cancel the printing;
a deleting unit configured to, in response to the printing caused to be performed by the print inst on received by the receiving unit being canceled. delete the document data;
and
a first recording unit configured to, in response to the printing caused to be performed by the print instruction received by the receiving unit being canceled by the canceling unit, record a number of the recording media or a number of faces of the recording media that, as a result of the canceling of the printing in accordance with the canceling instruction, will not be consumed, the number recorded by the recording unit being calculated on a basis of a number of pages of the document data and a print setting in the print instruction, and
the information aggregation device includes:
a reception unit configured to receive, from each of the plurality of print management devices, the number of the recording media recorded by the first recording unit or the number of faces of the recording media recorded by the first recording unit that, as the result of the canceling of the printing in accordance with the canceling instruction, will not be consumed;
a second recording unit configured to record information obtained by aggregating the number of the recording media received by the reception unit or the number of faces of the recording media received by the reception unit; and
an outputting unit configured to output information on the number of the recording media recorded by the second recording unit or the number of faces of the recording media recorded by the second recording unit that, as the result of the canceling of the printing in accordance with the canceling instruction, will not be consumed.

15. A non-transitory computer readable medium storing a program that causes a computer to execute a process for print management, the process comprising:
receiving a print instruction to perform printing of document data on recording media;
canceling the printing caused to be performed by the print instruction thus received, in accordance with a canceling instruction to cancel the printing;
in response to the printing caused to be performed by the print instruction received by the receiving unit being canceled, deleting the document data;
in response to the printing caused to be performed by the print instruction being canceled, recording a number of the recording media or a number of faces of the recording media that, as a result of the canceling of the printing in accordance with the canceling instruction, will not be consumed, the recorded number being calculated on a basis of a number of pages of the document data and a print setting in the print instruction; and outputting information on the number of the recording media or the number of faces of the recording media that, as the result of the canceling of the printing in accordance with the canceling instruction, will not be consumed.

16. A print management system comprising:

a receiving unit configured to receive a print instruction to perform printing of document data on recording media;

a canceling unit configured to cancel the printing caused to be performed by the print instruction received by the receiving unit, in accordance with a canceling instruction of the print;

a deleting unit configured to, in response to the printing caused to be performed by the print instruction received by the receiving unit being canceled, delete the document data;

a recording unit configured to, in response to the printing caused to be performed by the print instruction received by the receiving unit being canceled by the canceling unit, record a number of the recording media or the number of faces of the recording media that, as a result of the canceling of the printing in accordance with the canceling instruction, will not be consumed, the number recorded by the recording unit being calculated on a basis of a number of the pages of the document data and a print setting in the print instruction; and an outputting unit configured to output information on the number of the recording media recorded by the recording unit or the number of faces of the recording media recorded by the recording unit that, as the result of the canceling of the printing in accordance with the canceling instruction, will not be consumed.

17. The print management system according to claim 16, wherein the outputting unit is configured to output the information outside of the print management device.

18. The print management system according to claim 16, wherein the number of faces of the recording media is determined by counting the front and rear faces of the recording media individually.

\* \* \* \* \*